Figure 1:
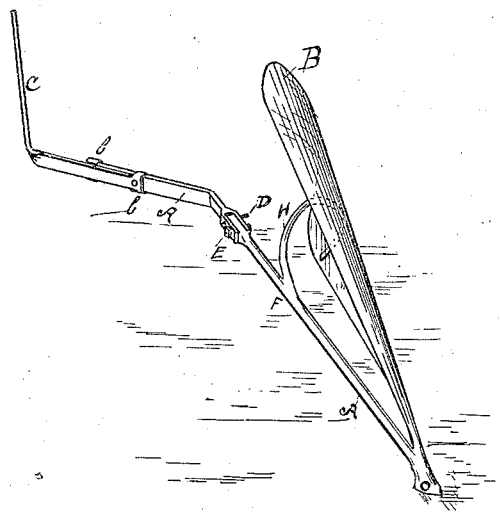

(No Model.)

W. H. STONE.
FENDER FOR PLOWS.

No. 311,857.   Patented Feb. 3, 1885.

2 Sheets—Sheet 1.

(No Model.)
W. H. STONE.
FENDER FOR PLOWS.
No. 311,857. Patented Feb. 3, 1885.
2 Sheets—Sheet 2.
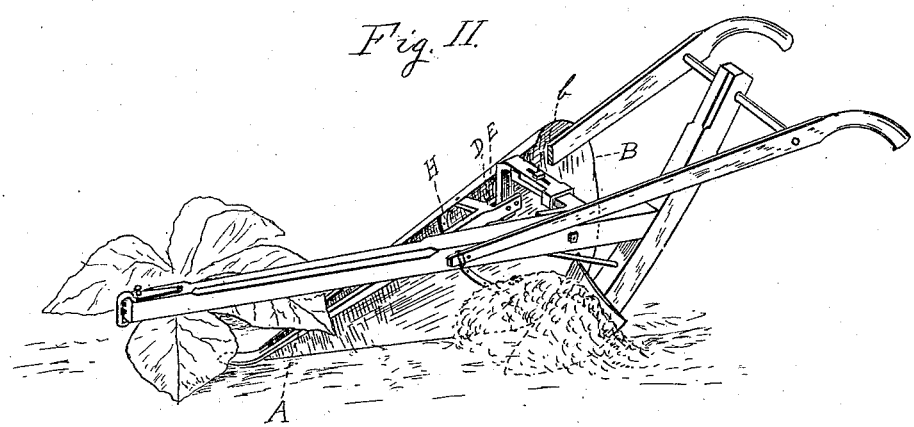
Fig. II.
WITNESSES:
INVENTOR:
By his Attorney.

UNITED STATES PATENT OFFICE.

WILLIAM H. STONE, OF BETHEL, OHIO, ASSIGNOR OF ONE-HALF TO EUGENE DUNNING, OF SAME PLACE.

FENDER FOR PLOWS.

SPECIFICATION forming part of Letters Patent No. 311,857, dated February 3, 1885.

Application filed September 11, 1884. (No model.)

*To all whom it may concern:*

Be it known that I, WILLIAM H. STONE, of the town of Bethel, county of Clermont, and State of Ohio, have invented a new and useful Fender for Plows and Cultivators, of which the following is a full and exact description, reference being had to the drawings, which make a part of this specification.

The object of my invention is to furnish a concave shield to be attached to plows or cultivators to protect the leaves of tobacco or other crop while plowing or cultivating.

Figure I is a perspective view, and Fig. II is an inner or side view, of my fender and vine-lifter, showing mode of construction, attention being called to the letters, which, taken in connection with the figures, is a description of my invention, which consists of a metal concave (the shape is not new) shield, which is attached to a frame, the two together forming the fender and vine-lifter.

A is the arm or shaft. B is the concave shield-plate, which is united at the front, forming a shovel-point. H is the curved supporting-arm with shank C, which is provided with adjusting-slide $b$ and hinge D E.

What I claim as new, and desire to secure by Letters Patent, is—

A combined fender and vine-lifter with the concave shield-plate B, the arm or shaft A, united therewith at the front and forming a shovel-point, the curved supporting-arm H, and the shank C, provided with the adjusting-slide $b$ and hinge-joint D E, substantially as shown and described.

In testimony that I claim the above I have hereunto subscribed my name in the presence of two witnesses.

WM. H. STONE.

Witnesses:
EUGENE DUNNING,
P. T. SOUTH.